US009245361B2

(12) United States Patent
Linnerud et al.

(10) Patent No.: US 9,245,361 B2
(45) Date of Patent: Jan. 26, 2016

(54) CONSOLIDATING GLYPHS OF A FONT

(75) Inventors: Paul Linnerud, Woodinville, WA (US); Gregory Hitchcock, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 281 days.

(21) Appl. No.: 13/223,601

(22) Filed: Sep. 1, 2011

(65) Prior Publication Data

US 2013/0057554 A1 Mar. 7, 2013

(51) Int. Cl.
*G06T 11/00* (2006.01)
*G06K 9/36* (2006.01)
*G06T 11/20* (2006.01)
*G06T 9/20* (2006.01)

(52) U.S. Cl.
CPC *G06T 11/203* (2013.01); *G06T 9/20* (2013.01)

(58) Field of Classification Search
USPC .......................................................... 345/471
See application file for complete search history.

(56) References Cited

U.S. PATENT DOCUMENTS

| 5,027,304 | A | * | 6/1991 | Jeng et al. ...................... 345/170 |
| 5,468,077 | A | * | 11/1995 | Motokado et al. .............. 400/76 |
| 5,524,182 | A | * | 6/1996 | Chari et al. .................. 358/1.11 |
| 5,577,177 | A | | 11/1996 | Collins |
| 5,577,183 | A | * | 11/1996 | Weyand ........................ 358/1.15 |
| 5,754,187 | A | * | 5/1998 | Ristow et al. ................. 345/469 |
| 5,926,565 | A | * | 7/1999 | Froessl .......................... 382/181 |
| 6,031,622 | A | * | 2/2000 | Ristow et al. ................. 358/1.11 |
| 6,232,987 | B1 | | 5/2001 | Choi |
| 6,678,410 | B1 | | 1/2004 | Phinney |
| 6,992,671 | B1 | * | 1/2006 | Corona ......................... 345/467 |
| 7,006,108 | B2 | | 2/2006 | Perry |
| 7,095,412 | B2 | * | 8/2006 | Salesin et al. ................. 345/469 |
| 2003/0043151 | A1 | | 3/2003 | Choi |
| 2013/0033498 | A1 | | 2/2013 | Linnerud et al. |

OTHER PUBLICATIONS

Yahya; et al., "An Automatic Generation of G1 Curve Fitting of Arabic Characters using Rational Bezier Cubic with Weight Adjustments"—Published Date: Dec. 6-8, 2005, http://eprints.usm.my/506/1/An_Automatic_Generation_Of_G1_Curve_Fitting_Of_Arabic_Characters_Using_Rational_Bezier_Cubic_With_Weight_Adjustments.pdf.
Piska, Karel, "Creating Type 1 Fonts from Metafont Sources: Comparison of Tools, Techniques and Results"—Published Date: Sep. 3, 2004 http://www-hep2.fzu.cz/~piska/TUG2004/piskatb2.pdf.
"AAT Font Quality Specification"—Retrieved Date: May 6, 2011 http://developer.apple.com/fonts/TTQualSpec/QS02/FQS2.html.
"Glyf—Glyf Data", Retrieved May 9, 2011, http://www.microsoft.com/typography/otspec/glyf.htm.

* cited by examiner

*Primary Examiner* — Devona Faulk
*Assistant Examiner* — William Beutel
(74) *Attorney, Agent, or Firm* — Sunah Lee; Fehmi Chebil; Micky Minhas

(57) ABSTRACT

One or more techniques and/or systems are disclosed for consolidating one or more glyphs of a font. A common contour, comprising a glyph contour that occurs more than once in one or more glyphs of the font, can be identified. A common simple glyph can be created for the identified common contour. A reference to the common simple glyph can replace one or more occurrences of the common contour in the one or more glyphs of the font. Given that the common simple glyph is generally smaller than the common contour, an amount of font related data for the font can be reduced, thus reducing overhead associated with storing and/or presenting the font.

20 Claims, 9 Drawing Sheets

CONSOLIDATING GLYPHS OF A FONT

BACKGROUND

In a computing environment, a computer font can comprise a style of characters (e.g., alphanumeric characters) in a particular typeface. Computer fonts can typically be scaled to larger or smaller sizes, bolded and/or italicized while retaining their typeface style. Characteristics of a font can comprise a stroke width (weight), character slope or angle, and character width (e.g., as well as height). Metrics for rendering (e.g., rasterizing) fonts on a display may comprise metadata describing individual glyphs, and/or glyph contours, for respective characters of the font.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

It may be appreciated that a font or rather glyphs of the font (e.g., used to make up characters or portions of characters of the font) may be defined in a number of ways. For example, in some fonts glyphs are primarily defined by one or more mathematical representations (e.g., using x and y coordinates and flags). Additionally, optional instructions (e.g., in the form of "hints") may also be used in defining such fonts to adjust rendering, for example, so that the font, or rather one or more glyphs or characters of the font, appear as desired when rendered at different sizes. In other fonts, for example, glyphs may be defined using, among other things, tables and/or flags. Regardless of the manner of defining or representing a font, it can be appreciated that repeated occurrences of data within the representation(s) can lead to additional overhead associated with the font (e.g., additional storage requirements, additional computational resource requirements, etc.).

Accordingly, one or more techniques and/or systems are disclosed for reducing an amount of glyph-related data associated with a font. For example, an amount of glyph data contained in one or more tables for a font can be reduced, while a functional equivalence of this font data can be maintained (e.g., so that resulting characters of the font, composed of glyphs, appear as desired when rendered). As provided herein, reduction of font data is achieved through consolidation. For example, glyphs of a font can comprise contours that may be repeated in several places in the font (e.g., where a contour may comprise an entire glyph or a portion of a glyph). Accordingly, at least some of these "common" contours may be replaced in one or more glyphs with merely a reference to a common simple glyph that has been created for the common contour. Replacing one or more occurrences of the common contour with the reference, for example, can reduce an overall amount of data associated with the font (e.g., reducing a file size file associated with the font). It may be appreciated that although reference is at times made herein to consolidation of, consolidating and/or the like a glyph of a font, that it is generally (common) contours of a font that are consolidated (e.g., where a contour may comprise an entire glyph in some instances, or rather the glyph is comprised of merely a single contour). It may also be appreciated that, at times, a glyph may comprise an entire character of the font, or rather the character is comprised of merely a single glyph, and/or that a character can map to multiple glyphs (e.g. a or a are the same character but where one instance of the character is comprised by an italicized glyph and the other instance of the character is comprised by an unitalicized glyph). Additionally, it may be appreciated that the term "character" and/or the like may be regarded in the art as comprising a semantic meaning while the term "glyph" is a pictorial representation of a character. For example, the letter B is a character that has the semantic meaning of the /b/ phonetic sound and there are several potential glyphs (e.g., where respective glyphs are regarded as having a one-to-one mapping to different characters) that can represent that character, including B, b, or even the rebus picture of a bee. Given that glyphs may be known in the art to map to semantic meanings, a conventional definition of "glyph" and/or the like may regard the instant application as breaking glyphs down into what might be called "sub-glyphs" and operating on such "sub-glyphs", where such "sub-glyphs" do not pertain to semantic meaning but instead pertain to basic graphic elements that make up a glyph outline. Nevertheless, the term "sub-glyph" and/or the like is not used herein. Rather, contours are referenced herein to provide for an entity that allows graphical elements of a glyph to be broken down (further) into sub-parts that may not necessarily map directly to entire/full characters.

In one embodiment of consolidating one or more glyphs of a font, a common simple glyph can be created for a common contour that is identified in the one or more glyphs of the font. Further, the identified common contour can be replaced in the one or more glyphs with a reference to the created common simple glyph, which can provide for consolidation of the one or more glyphs in the font.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
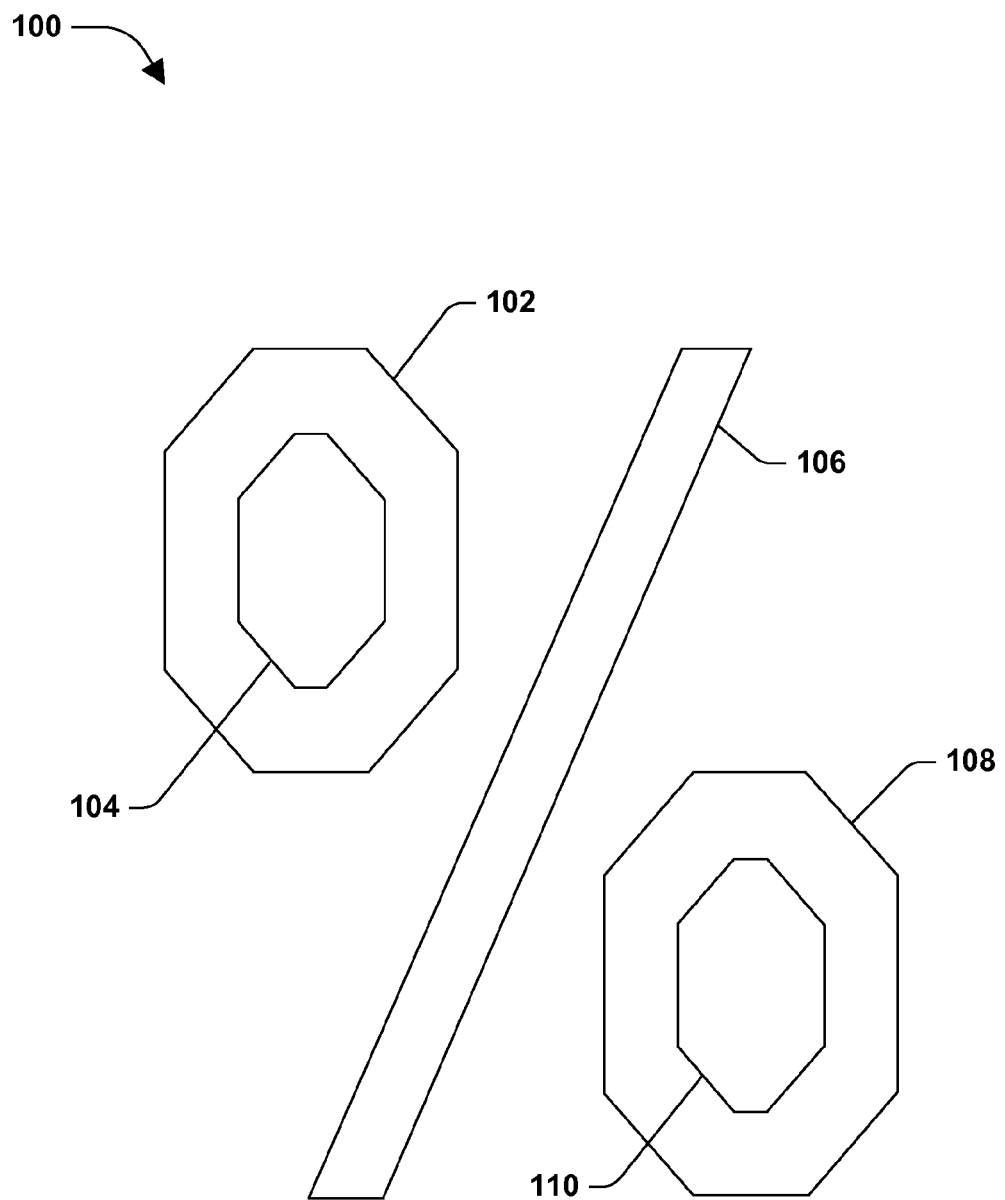
FIG. 1 illustrates an example embodiment of a character of a font comprised of one or more glyphs of the font.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is a diagram illustrating an example embodiment 100 of a character of a font (e.g., percentage sign or symbol), where the character comprises, or is comprised of, one or more glyphs of the font, and where respective glyphs may be comprised of one or more contours. In one example, the character may be regarded as comprising of a single glyph that comprises an outline of the character, and that is typically filled in with a chosen color when rendered for display. In this example embodiment 100, the glyph may be regarded as comprising five contours 102, 104, 106, 108, 110.

A glyph contour (e.g., contour of a glyph) can comprise a closed line that indicates a shape comprising a portion of the glyph. For example, a first glyph contour 102 is a large stylized circle, comprising the outer portion of the upper "o" portion of the percentage sign. Further, in this example, the first glyph contour 102 is similar to a fourth glyph contour 108. Additionally, a second glyph contour 104, comprising an inner portion of the upper "o" portion of the percentage sign is similar to a fifth glyph contour 110. A third glyph contour is an outline of a "slash", comprising the center portion of the percentage sign. Moreover, the first glyph contour 102, second glyph contour 104, fourth glyph contour 108 and fifth glyph contour 110 may be similar or comparable should the second glyph contour 104 and fifth glyph contour 110 be normalized, the first glyph contour 102 and fourth glyph contour 108 be normalized and/or the first glyph contour 102, second glyph contour 104, fourth glyph contour 108 and fifth glyph contour 110 be normalized (relative to one another). In some fonts, respective glyph contours are described by points (e.g., x and y coordinates in coordinate space), indicating a location of the contour, and lines between the points, indicating the outline of the contour (e.g., described by flags at respective points).

Figure 2:
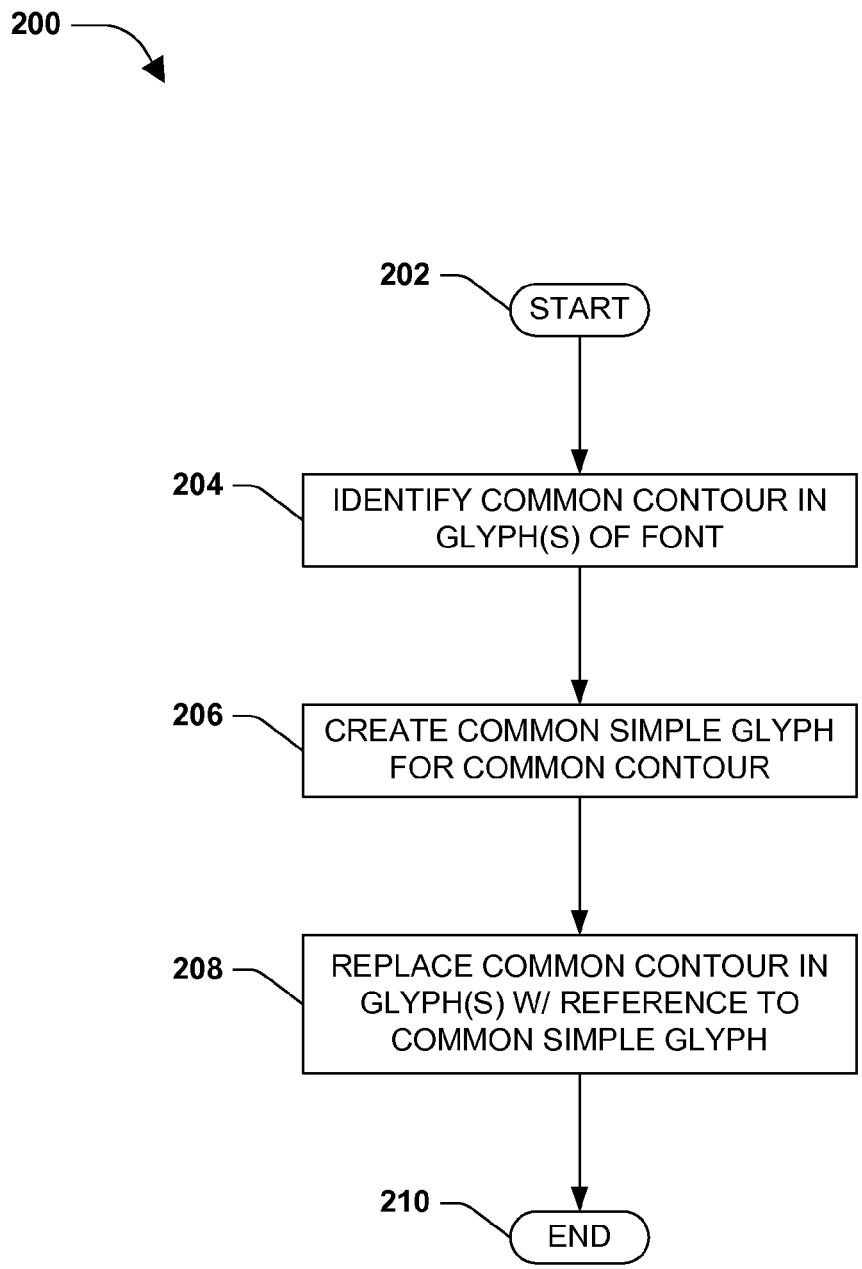
FIG. 2 is a flow diagram illustrating an exemplary method for consolidating one or more glyphs of a font.

FIG. 2 is a flow diagram illustrating an exemplary method 200 for reducing an amount of data associated with a font by consolidating one or more glyphs, or rather common contours, of a font. The exemplary method 200 begins at 202 and involves identifying a common contour in one or more glyphs of the font, at 204. In one embodiment, the common contour can comprise a same glyph contour that is identified at least twice in the one or more glyphs of the font. As an example, in FIG. 1, the second glyph contour 104 and the fifth glyph contour 110 may comprise a first common contour. Further, in FIG. 1, the first glyph contour 102 and the fourth glyph contour 108 may comprise a second common contour.

At 206, a common simple glyph is created for an identified common contour. For example, a common simple glyph can comprise a definition, description, etc. (e.g., in a font programming language, mathematical representation, etc.) corresponding to a common contour identified in one or more locations in the font. In one embodiment, the description for the common simple glyph may be copied from a glyph comprising the common contour. At 208, one or more occurrences of the common contour in the one or more glyphs are replaced with a reference to the common simple glyph, in order to consolidate the one or more glyphs in the font. In one example, creating the common simple glyph may merely comprise replacing occurrences of the common contour with a reference to an instance of the common contour (that is not replaced with a reference). For example, merely one instance of the common contour (or rather definitions therefore) may be maintained while other instances of the common contour (definitions therefore) are replaced with a reference to the common contour (definitions therefore). In this manner, a separate set of definitions for the common simple glyph need not be created, yet the other occurrences of the common contour still have something to reference.

Having replaced the common contour in the one or more glyphs with a reference to the common simple glyph, the exemplary method 200 ends at 210.

Figure 3:
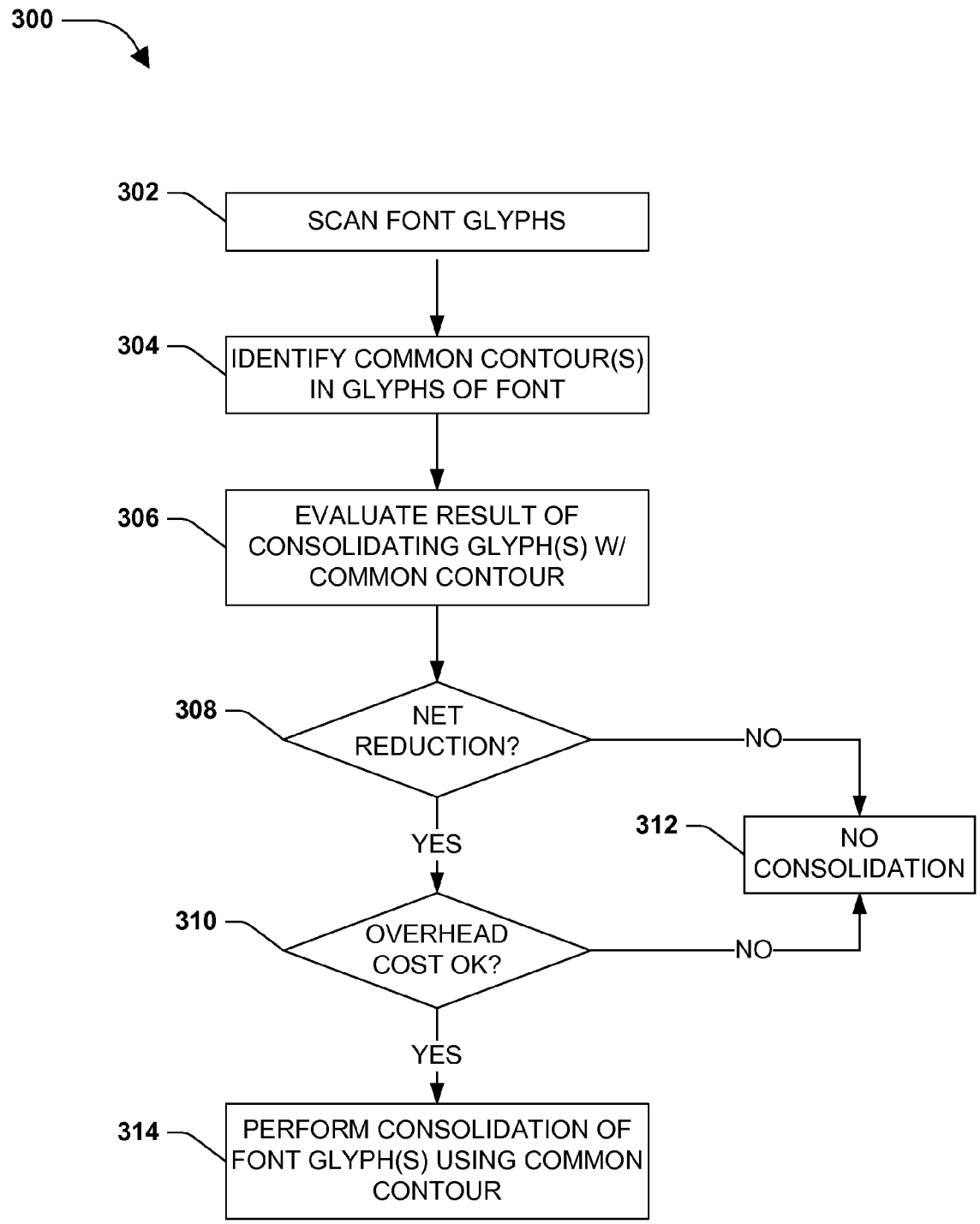
FIG. 3 is a flow diagram illustrating an example embodiment where one or more portions of one or more techniques described herein may be implemented.

FIG. 3 is a flow diagram illustrating an example embodiment 300 where one or more portions of one or more techniques described herein may be implemented. At 302, a font can be scanned for glyphs. As an illustrative example, a first contour can be identified in the font and the first contour can be compared against remaining contours in the font. Further, in this example, a second contour can be identified in the font and compared against the remaining contours in the font (e.g., and a third contour can be compared, and a forth contour can be compared, etc.). In one embodiment, the comparing of a contour to other contours in the font can comprise using a brute force search methodology, however, the techniques and systems described herein are not limited to any particular common contour search technique or system, and as such may comprise other search techniques in addition to or in alternative to brute force searching.

At 304, one or more common contours can be identified in one or more glyphs of the font. In one embodiment, the common contour can comprise a same glyph contour that is identified at least twice in the one or more glyphs of the font. That is, for example, when the first identified contour is compared with the other contours in the font, a same version of the contour is found (e.g., in a same glyph and/or in another glyph(s)). In one embodiment, identifying the common contour can comprise identifying a first instance of the same glyph contour in a first glyph and identifying a second instance of the same glyph contour in the first glyph and/or a second glyph, where the same glyph contour may be defined by a simple glyph in the font.

Figure 4A:
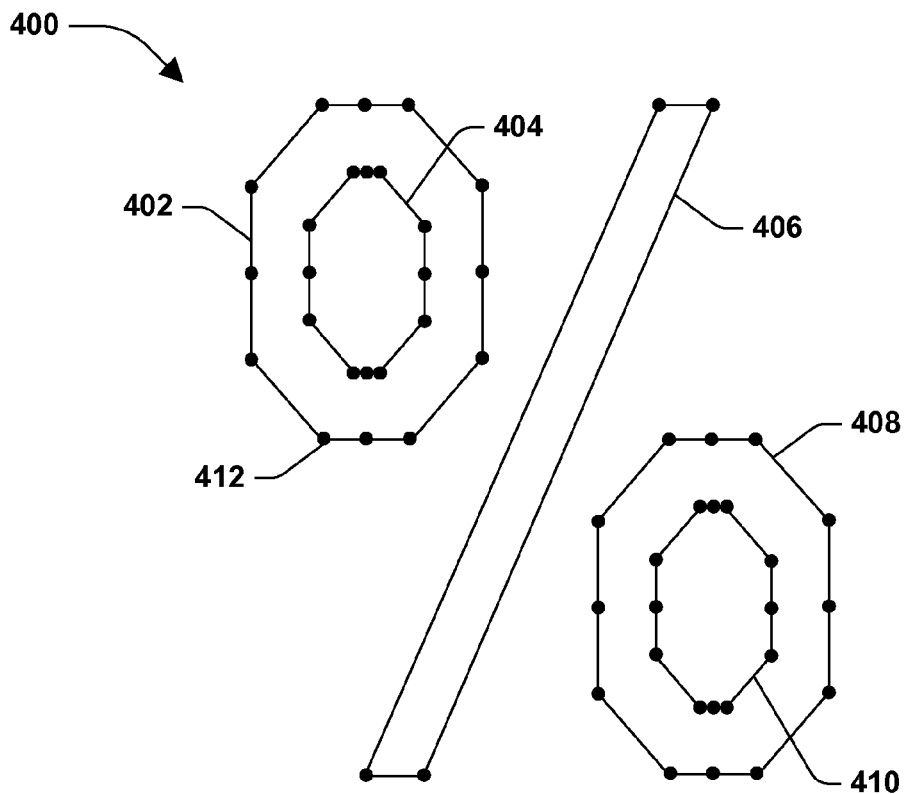
FIGS. 4A and 4B illustrate example embodiments of glyphs of a font.
Figure 4B:
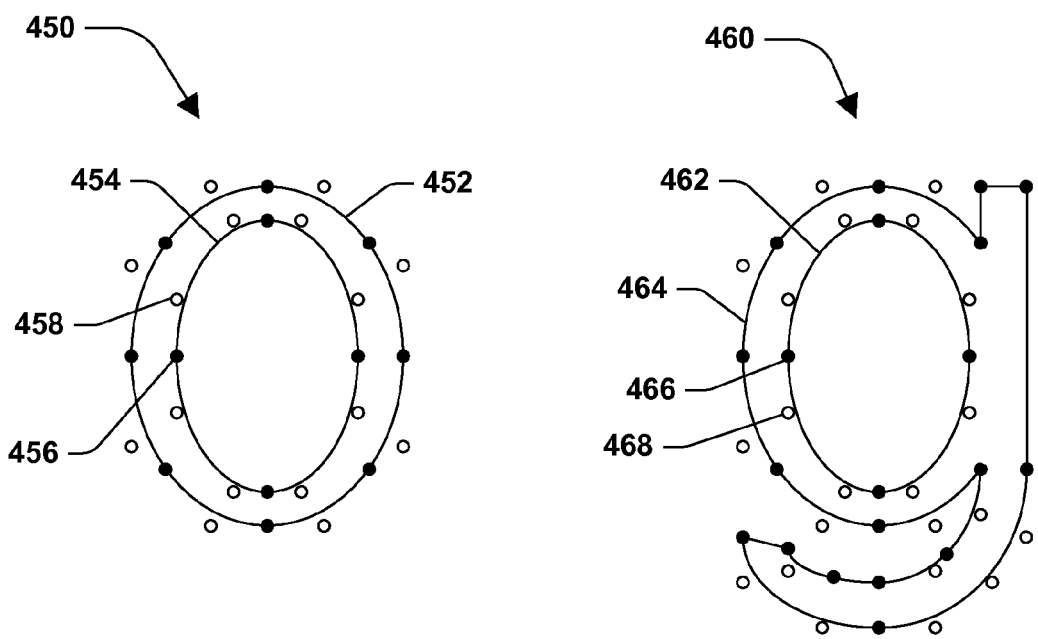

As an illustrative example, FIGS. 4A and 4B illustrate example embodiments 400, 450, 460 of glyphs of a font. In the example glyph 400, a first instance of a first glyph contour 402 can be compared with the other glyph contours (e.g., second glyph contour 404, third glyph contour 406, fourth glyph contour 408, fifth glyph contour 410) in the glyph 400 (e.g., and remaining glyph contours in the font), and a second instance of the same glyph contour can be found at the fourth glyph contour 408. Further, in this example, a first instance of the second glyph contour 404 can be compared with the other glyph contours in the glyph 400 (e.g., and remaining glyph contours in the font), and a second instance of the same glyph contour can be found at the fifth glyph contour 410. As another example, the example glyph 450 may comprise first glyph contour 452 and second glyph contour 454 and the exemplary glyph 460 may comprise first glyph contour 464 and second glyph contour 462. A first instance of the second glyph contour 454, in the example glyph 450, can be compared with the other glyph contours in the font, and a second instance of the same glyph contour can be found at the second glyph contour 462 in the example glyph 460.

In one embodiment, identifying the common contour can comprise normalizing the respective identified contours involved in the comparison. As an example, two contours involved in a comparison may comprise a same number of points, a same position (e.g., in coordinate space) of the points, a same order of the points and/or a same type of flags.

However, in this example, the compared contours may have different scales and/or translation factors (e.g., transformations, such as mirroring, reversal, rotating, enlarging, reducing, etc.). As an illustrative example, in FIG. 4A, the first glyph contour 402, second glyph contour 404, fourth glyph contour 408 and fifth glyph contour 410 may be comparable but for different scale(s) and/or translation(s), for example.

Accordingly, it may be appreciated that a first glyph contour and second glyph contour being compared (e.g., to identify the common contour) can be normalized for comparison, such that the first and second glyph contours comprise a same scale factor (e.g., size) and translation (e.g., position and/or rotation). In one embodiment, identifying the common contour can comprise determining if the first normalized glyph contour and the second normalized glyph contour respectively comprise a same number of points. Further, identifying the common contour can comprise determining if the first normalized glyph contour and the second normalized glyph contour respectively comprise a same position of points. Also, identifying the common contour can comprise determining if the first normalized glyph contour and the second normalized glyph contour respectively comprise a same order of points, and/or a same position and a same order of points. Additionally, identifying the common contour can comprise determining if the first normalized glyph contour and the second normalized glyph contour respectively comprise a same type of one or more flags.

As an illustrative example, in FIG. 4A, the respective contours 402, 404, 406, 408, 410, of the example glyph 400, comprises points 412 that can indicate a location in coordinate space of the contour. In this example, the first glyph contour 402 comprises a same number of points 412 (e.g., twelve) as the second glyph contour 404, fourth glyph contour 408 and fifth glyph contour 410. Further, the points 412 of the first glyph contour 402 are located in a same relative position as those of the fourth glyph contour 408 when normalized for translation, and as those for the second glyph contour 404 and fifth glyph contour 410 when normalized for scaling and translation for example. While not illustrated, the respective compared contours can comprise the same flags (e.g., describing a curve and/or direction of the contour line) at the respective points 412.

In one embodiment, identifying the common contour can comprise determining if the first normalized glyph contour and the second normalized glyph contour respectively comprise a same ordering of points. As an illustrative example, in FIG. 4B, the example glyph 450 comprises the first glyph contour 452 and the second glyph contour 454, respectively comprising on-line points 456 (e.g., points intersected by the line of the contour) and off-line points 458 (e.g., points not intersected by the line of the contour). In this embodiment, the points of the first glyph contour 452 can be arranged in a first particular order and the points of the second glyph contour 454 contour can be arranged in a second particular order, and when the first glyph contour 452 and the second glyph contour 454 are normalized relative to one another, the first and second particular orders are the same.

FIG. 4B further illustrates an example of how contours can be compared to identify a common contour. The second glyph contour 454, of the example glyph 450, comprises on-line points 456 and off-line points 458 that correspond to the on-line points 466 and off-line points 468 of the second glyph contour 462 of the example glyph 460 (e.g., where an on-line point generally refers to a point through which a line of the glyph passes and where an off-line point generally refers to a point through which a line of a glyph does not pass and is used to represent Bézier curves). In this example, the glyph 450 and glyph 460 have been normalized (e.g., transformations of the contour are normalized, comprising scaling and/or translation), such that they can be appropriately compared. Further, in this example, while the first glyph contour 452 of the example glyph 450 may have similar portions to a first glyph contour 464 of the example, glyph 460, the respective on-line and off-line points for the different glyph contours do not correspond such that a comparison may not be justified despite normalization, transformation, etc.

In one embodiment, an identified common contour may be used to identify the same common contour in a different font. As an example, a brute force searching method can utilize significant computing time and/or resources when respective contours of a font are individually identified and compared against all the other contours in the font. In this embodiment, those contours of a first font that are found to be common (e.g., found in more than one location in one or more of the glyphs of the first font), for example, may be used as a starting point for comparing against contours in a second font (e.g., as it may be likely that the common contour may also be common in another font). In this way, for example, computing time and/or resources may be reduced by reducing a need to identify contours to use for comparison.

Returning to FIG. 3, at 306, an evaluation can be made of a resulting glyph consolidation when using the one or more identified common contours. For example, when consolidating the glyphs of a font (e.g., substituting one or more occurrences of a common contour with a reference to a common simple glyph), additional glyphs may need to be created to accommodate the common contour, and/or to accommodate the glyph that has a reference replacing the common contour, and additional computing overhead may resultantly be incurred when performing the replacement and/or execution of the font, for example.

In one embodiment, when consolidating the one or more glyphs of the font, it can be determined whether a desired consolidation threshold is met. Further, in this embodiment, the common contour can be replaced in the one or more glyphs with the reference to the common simple glyph merely if the desired consolidation threshold is met. In one embodiment, determining whether the desired consolidation threshold is met can comprise identifying a reduction of stored data for executing the font and/or identifying a computing performance cost for consolidating the one or more glyphs of the font.

As an illustrative example, in FIG. 4A, a space needed to represent the respective contours 402, 404, 406, 408, 410 may be illustrated below:

| CONTOUR | SIZE IN BYTES |
|---|---|
| One (402) | 30 |
| Two (404) | 40 |
| Three (406) | 15 |
| Four (408) | 30 |
| Five (410) | 40 |

In this example, during consolidation, it may be determined that first glyph contour 402 and fourth glyph contour 408 comprise a first common contour and that second glyph contour 404 and fifth glyph contour 410 comprise a second common contour (e.g., in the absence of a scaling translation). A first common simple glyph (e.g., using 18 bytes of storage) can comprise first glyph contour 402 and fourth glyph contour 408, and a second common simple glyph (e.g., using 18 bytes of storage) can comprise second glyph contour 404 and fifth glyph contour 410. The percent sign glyph 400 can be converted to a complex glyph comprising references to the first and second common simple glyphs (e.g., to represent what previously was defined for 402, 404, 408, 410), as well as info. for the non-common third glyph contour 406. In this example, performing the consolidation can be contingent on an overall space savings of the font and/or additional overhead required to perform consolidation operations.

In this example, a new glyph may need to be created for the non-common third glyph contour 406, comprising the slash of the percentage sign. The third glyph contour 406 may, for example, be represented as a third simple glyph using twenty five bytes of storage. In this example, even though the storage needed for the non-common third glyph contour 406 increased (e.g., from 15 to 25), the new composite glyph merely needs sixty-one bytes of storage (e.g., 18+25+18=61), whereas the contours of the percent sign glyph 400 described above, needed one-hundred and fifty-five bytes of storage (e.g., 30+40+15+30+40=155). It will be appreciated that the referenced storage numbers are merely examples, and may not represent actual font data sizes.

Returning to FIG. 3, at 308, if there is not a net reduction of size (e.g., the consolidation does not meet a desired file size reduction for the font), and/or the overhead cost (e.g., additional storage, computing time, and/or computing resources) does not meet a desired threshold, at 310, the consolidation may not be performed, at 312. However, if there is a net reduction (YES at 308), and the overhead cost meets the desired threshold (YES at 310), the glyph consolidation can be performed using the one or more common contours, at 314.

Figure 5:
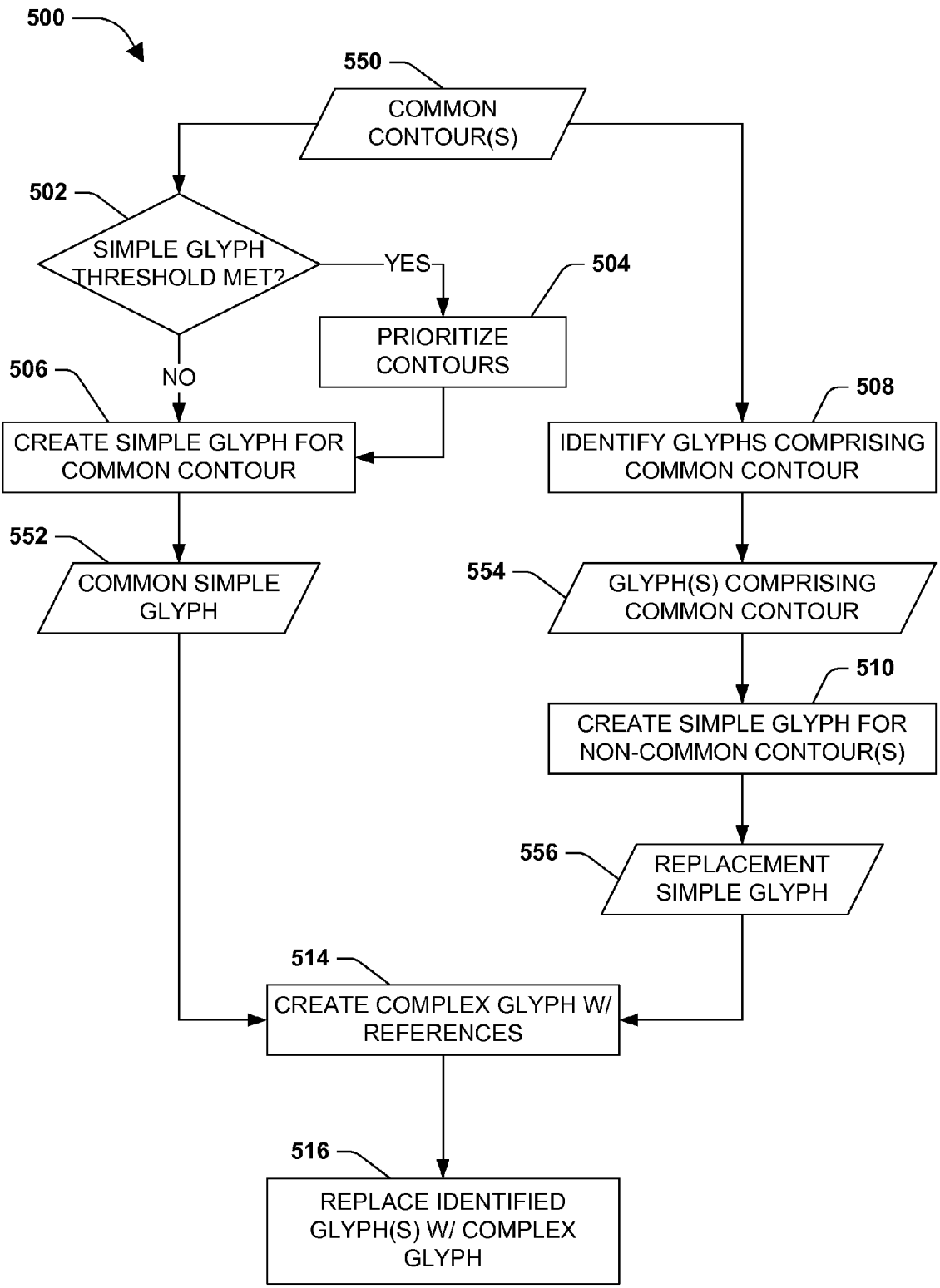
FIG. 5 is a flow diagram illustrating an example embodiment where one or more portions of one or more techniques described herein may be implemented.

FIG. 5 is a flow diagram illustrating an example embodiment 500 where one or more portions of one or more techniques described herein may be implemented. At 502 it can be determined whether a common simple glyph threshold is met. As an example, a font may comprise a limit for a number of glyphs (e.g., only allow a certain number of glyphs). In this example, the limit to the number of glyphs may limit a number of common simple glyphs that can be created for different identified common contours 550 (e.g., adding another common simple glyph may push the number of glyphs over the limit). Accordingly, if the simply glyph threshold is met (YES at 502), one or more common contours can be prioritized at 504. In one embodiment, a first common contour may be prioritized (e.g., for creation of a corresponding common simple glyph) over a second common contour (e.g., for which a corresponding common simple glyph may not be created). For example, if the first common contour occurs substantially more times in a font than the second common contour, then the first common contour may be prioritized over the second common contour because that would likely lead to a greater file size reduction, for example, because more lightweight references to a common simple glyph would be included in the font. Moreover, one or more existing common simple glyphs may be removed from the font to make room for one or more new common simple glyphs (e.g., where the new common simple glyphs provide a greater reduction in font related data than the existing common simple glyphs).

If the simple glyph threshold is not met (NO at 502) (e.g., and/or for one or more common contours from 504), a common simple glyph 552 can be created for a common contour 550 (e.g., creating a first common simple glyph for a first common contour, a second common simple glyph for a second common contour, etc.). As an example, creating a common simple glyph 552 can comprise copying a definition(s) for the common contour and creating a new simple glyph comprising the copied definition(s). It may be appreciated that a common simple glyph may be reused, recycled, etc. by other fonts where the corresponding common contour is identified in the other fonts.

At 508, one or more glyphs 554 of the font that comprise the common contour can be identified. This may include glyphs from which the common contour was initially identified as well as glyphs recently identified as comprising the common contour based upon a new scan of the font, for example.

In one embodiment, the identified one or more glyphs 554 that comprise the common contour can be converted to respective complex glyphs that comprise a reference to the common simple glyph created at 506. In one embodiment, replacing the common contour in the one or more glyphs 554 with a reference to the common simple glyph 552 can comprise creating, at 510, a replacement simple glyph 556 for a non-common contour of a glyph (of the one or more glyphs 554) comprising the common contour. As an illustrative example, in FIG. 4A, the third glyph contour 406 may comprise a non-common contour (e.g., the slash symbol of the percentage sign). In this example, a replacement simple glyph can be created for this non-common third glyph contour 406, such as by copying one or more definitions describing the non-common third glyph contour 406 into a new simple glyph.

At 514, a replacement complex glyph can be created, which can be used, for example, to replace a glyph comprising the common contour. Such a replacement complex glyph may comprise a reference to the common simple glyph 552 (e.g., or one or more corresponding references to one or more common simple glyphs) and a reference to the replacement simple glyph 556. As an illustrative example, in FIG. 4A, a first common simple glyph may be created for the first glyph contour 402 and the fourth glyph contour 408, and a second common simple glyph may be created for the second glyph contour 404 and the fifth glyph contour 410. Further, in this example, a replacement simple glyph may be created for the third glyph contour 408 (non-common contour). In this embodiment, the newly created complex glyph can comprise a reference to the first common simple glyph, a reference to the second common simple glyph, and a reference to the replacement simple glyph. Thus, the percentage symbol may merely be represented by three relatively lightweight references rather than five separate instructions sets (e.g., for 402, 404, 406, 408 and 410).

In one embodiment, the replacement complex glyph may also comprise a reference to one or more transformations for a common simple glyph. As an example, a transformation for a simple glyph can comprise a scaling factor and/or a translation factor. In this embodiment, a size (scale) and/or a location/rotation (translation) of the common contour may be different between glyphs comprising the common contour. Therefore, in this example, a scaling factor reference may be associated with the reference to the common simple glyph and/or a translation factor may be associated with the reference to the common simple glyph, such that a size and position/rotation of the common contour is appropriate for the glyph when rendered.

At 516, in FIG. 5, the glyph comprising the common contour can be replaced with the replacement complex glyph in the font. As an example, the replacement complex glyph (e.g., three references for percentage symbol in FIG. 4A) can take the place of the glyph that comprised the common contour in the font to achieve desired savings.

Figure 6:
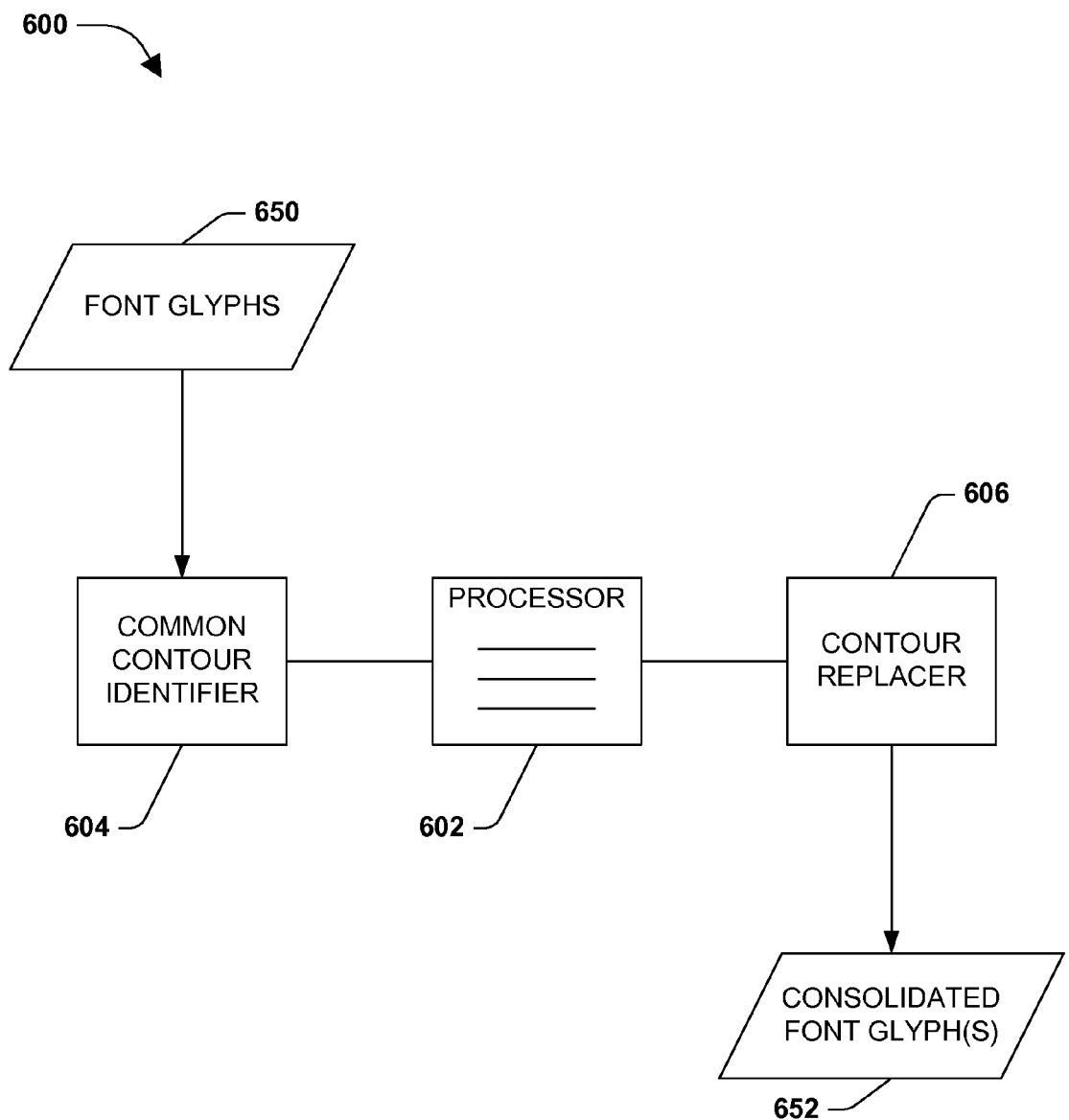
FIG. 6 is a component diagram illustrating an exemplary system for consolidating one or more glyphs of a font.

FIG. 6 is a component diagram illustrating an exemplary system 600 for consolidating one or more glyphs, or rather common contours, of a font to reduce an amount of font data for the font. A computer-based processor 602 is configured to process data for the system and is operably coupled with a common contour identification component 604. The common contour identification component 604 is configured to identify a common contour in one or more glyphs of the font 650. For example, the one or more glyphs of the font 650 can comprise contours, where contours of a glyph may make up one or more portions of an outline of the glyph. Further, the one or more glyphs of the font 650 may comprise a contour that is the same or that occurs in more than one location of the font, and thus may be regarded as a common contour. In this example, the common contour identification component 604 can scan glyphs of the font to identify one or more common contours.

In the exemplary system 600, a contour replacement component 606 is operably coupled with the processor 604, and is configured to replace one or more occurrences of an identified common contour with a reference to a common simple glyph created for the identified common contour. For example, a common simple glyph can be created for the identified common contour (e.g., and other common simple glyphs can be created for other commonly occurring contours). In this example, the contour replacement component 606 can create one or more consolidated font glyphs 652 by replacing occurrences of the common contour with a reference to the common simple glyph. In this way, for example, an amount of font related data for the font may be reduced.

Figure 7:
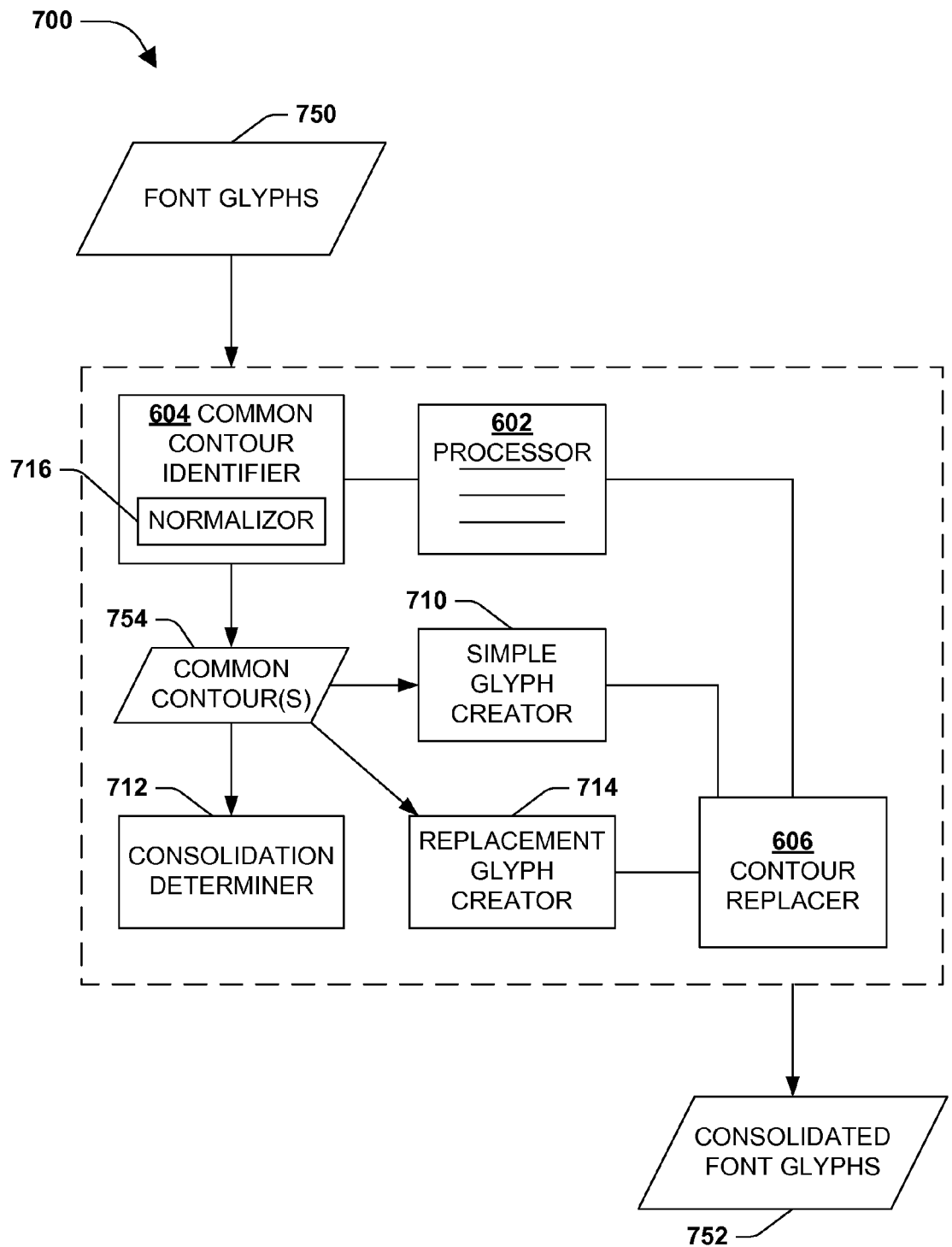
FIG. 7 is a component diagram illustrating an example embodiment where one or more systems described herein may be implemented.

FIG. 7 is a component diagram illustrating an example embodiment 700 where one or more systems described herein may be implemented. In this example 700, an extension of FIG. 6 is provided and thus description of elements, components, etc. described with respect to FIG. 6 may not be repeated for simplicity. In this embodiment, common contour(s) 754 can comprise a same glyph contour that is identified in a plurality of locations in the one or more glyphs of a font 750. As an example, the same contour may be identified more than once in a first glyph of the font and/or one or more times in second glyphs of the font.

In the example embodiment 700, a consolidation determination component 712 can be configured to determine whether a desired consolidation threshold is met when consolidating the one or more glyphs of the font 750. In one embodiment, the contour replacement component 606 can be configured to replace a common contour 754 merely if the desired consolidation threshold is met. For example, if the consolidation determination component 712 determines that a threshold amount of storage space is saved and/or a threshold overhead cost is not exceeded, for one or more of the common contours 754, then one or more font glyphs can be consolidated 752.

A simple glyph creation component 710 can be configured to create a common simple glyph for a common contour 754. Further, a replacement glyph creation component 714 can be configured to create a non-common contour glyph (e.g., replacement simple glyph) for a non-common contour of a glyph identified as comprising the common contour 754. For example, a font glyph 750, which comprises the identified common contour 754, may also comprise one or more non-common contours. In this example, the replacement glyph creation component 714 can create a new/replacement simple glyph that comprises the non-common contour(s).

The replacement glyph creation component 714 can also be configured to create a replacement complex glyph that comprises a first reference to the common simple glyph and a second reference to the non-common contour glyph. For example, the replacement complex glyph may be used by the contour replacement component 606 to replace a corresponding font glyph 750 in order to consolidate font glyphs. In this example, instead of comprising the glyph instructions of the original font glyph 750, the replacement complex glyph may merely comprise appropriate references to the common simple glyph and the non-common contour glyph.

In the example embodiment 700, the common contour identification component 604 comprises a normalization component 716 that may be configured to normalize a first glyph contour and a second glyph contour so that the first glyph contour can be compared with the second glyph contour. For example, the common contour identification component 604 may compare contours of the glyphs of the font to identify the common contours (e.g., comprising a same number or points, point locations, ordering of points and/or point flags, etc.). However, the contours used for identification may not comprise a same scaling and/or translation factor (e.g., transformations). In this example, the normalization component 716 can normalize the first and second glyph contours such that they comprise a same scaling factor and/or a same translation factor, for a more appropriate comparison. For example, a mirroring and/or reversal type of transformation (s), among others, may be performed to allow for the comparison.

Figure 8:
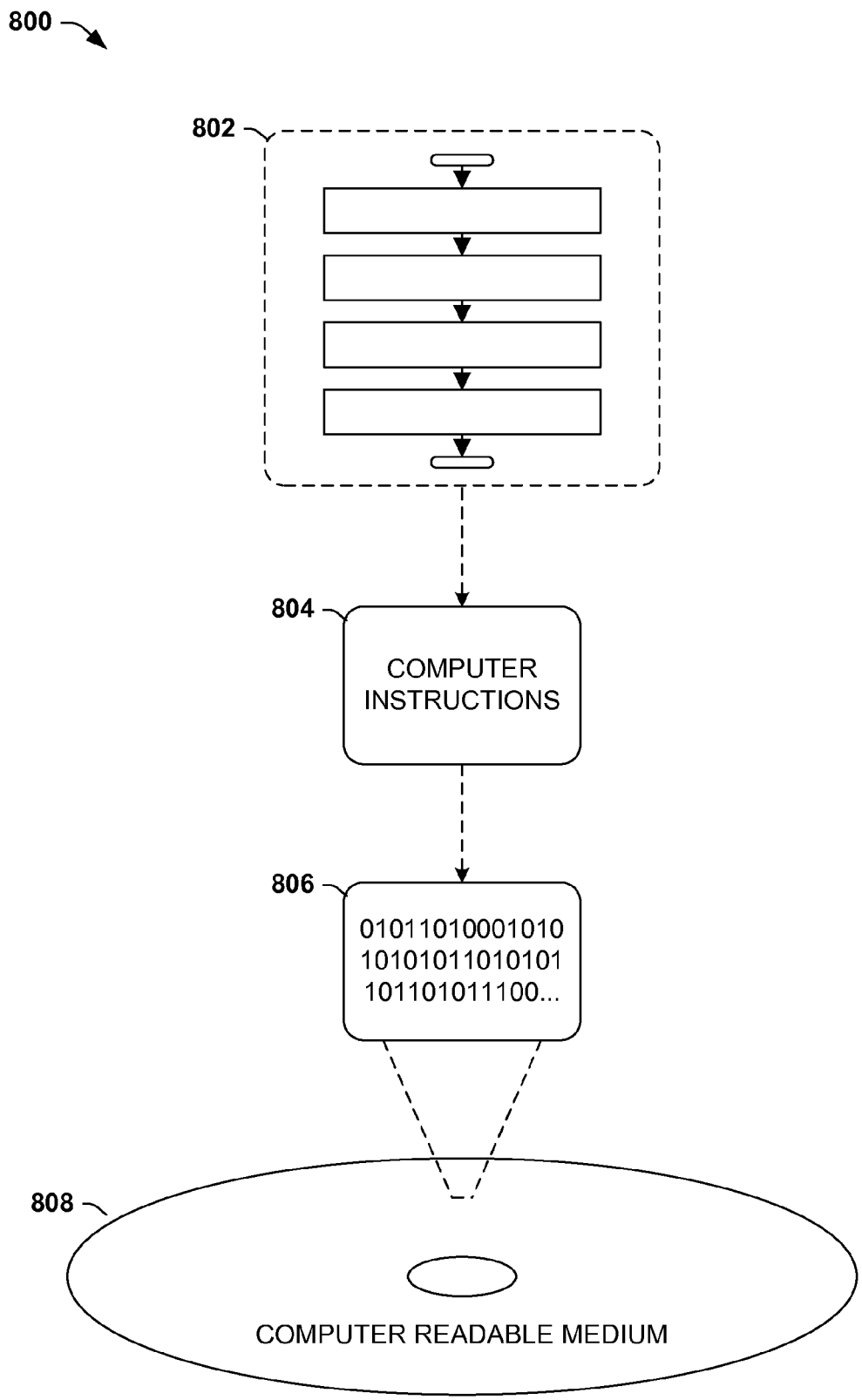
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., a CD-R, DVD-R, or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as at least some of the exemplary method 200 of FIG. 2, for example. In another such embodiment, the processor-executable instructions 804 may be configured to implement a system, such as at least some of the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
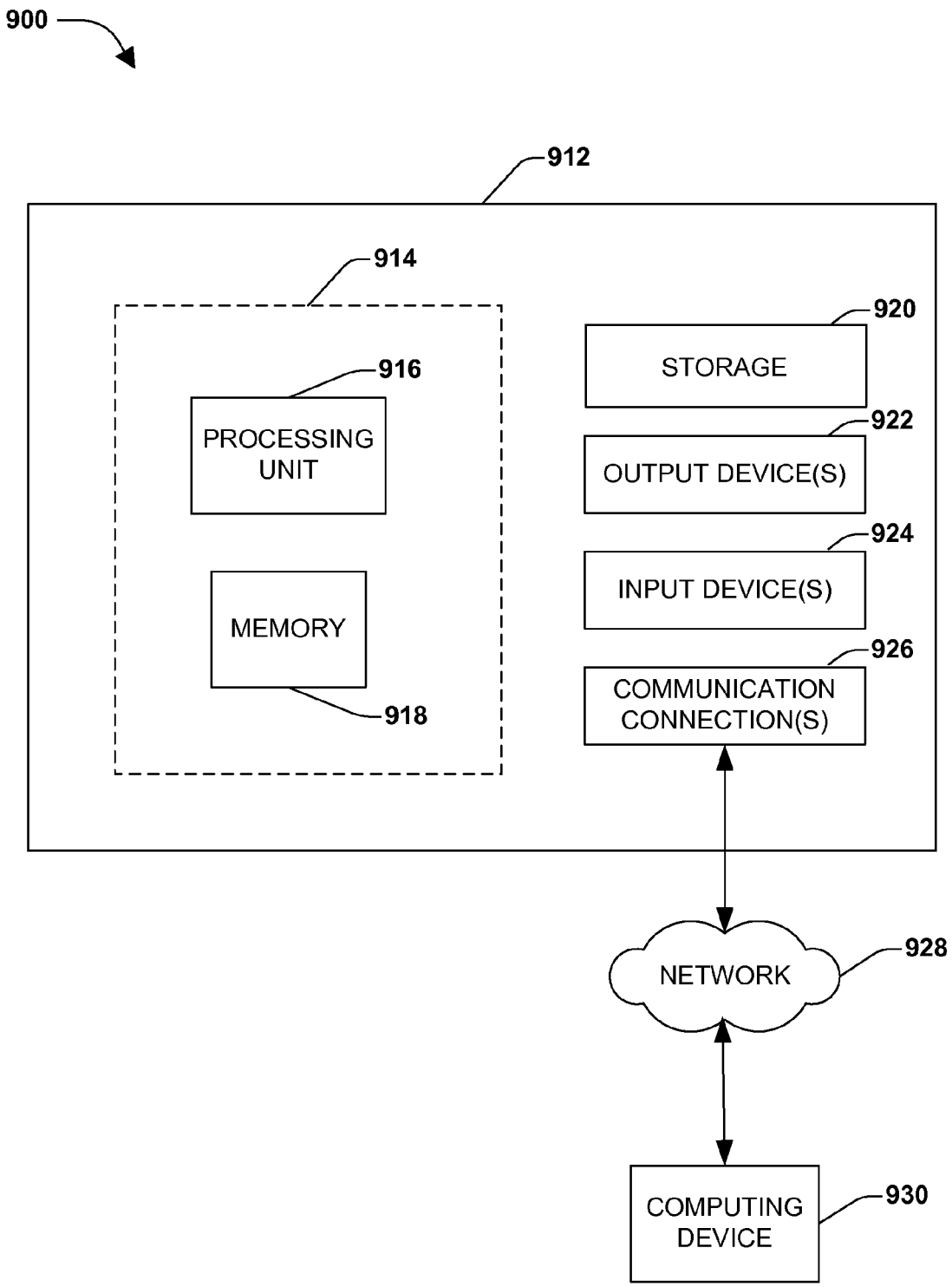
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for consolidating a glyph of a font, comprising:
   normalizing a first contour in the glyph and a second contour in the glyph to generate a first normalized contour and a second normalized contour;
   comparing the first normalized contour to the second normalized contour, comprising at least one of comparing a first number of points of the first normalized contour to a second number of points of the second normalized contour, comparing a first position of points of the first normalized contour to a second position of points of the second normalized contour or comparing a first order of points of the first normalized contour to a second order of points of the second normalized contour;
   based upon the comparing, determining that the first normalized contour and the second normalized contour comprise at least one of a same number of points, a same position of points or a same order of points indicating that the first contour and the second contour correspond to a common contour; and
   based upon the determining, replacing the first contour with a first reference to a common simple glyph for the common contour and replacing the second contour with a second reference to the common simple glyph to consolidate the glyph.

2. The method of claim 1, the determining comprising determining that the first normalized contour and the second normalized contour comprise the same number of points.

3. The method of claim 1, the determining comprising determining that the first normalized contour and the second normalized contour comprise the same position of points.

4. The method of claim 1, the determining comprising determining that the first normalized contour and the second normalized contour comprise the same order of points.

5. The method of claim 1, at least one of the first contour or the second contour comprising a closed line.

6. The method of claim 1, comprising:
   determining whether a desired consolidation threshold is met; and
   consolidating the glyph merely if the desired consolidation threshold is met.

7. The method of claim 6, the determining whether the desired consolidation threshold is met comprising one or more of:
   identifying a reduction of stored data for executing the font; or
   identifying a computing performance cost for consolidating the glyph.

8. The method of claim 1, comprising prioritizing a first common contour over a second common contour for consolidation.

9. The method of claim 1, comprising creating the common simple glyph for the common contour comprising creating a new glyph comprising the common contour in a glyph table used for more than one font.

10. The method of claim 1, comprising consolidating a second glyph of the font using a third reference to a second common simple glyph.

11. The method of claim 1, comprising:
    creating a replacement simple glyph for the glyph, the replacement simple glyph comprising one or more non-common contours.

12. The method of claim 1, comprising creating a complex glyph comprising:
    a reference to one or more transformations for the common simple glyph.

13. A processing system for consolidating a glyph of a font, comprising:
    one or more processing units; and
    memory comprising instructions that, when executed at least in part via at least one of the one or more processing units, configures the processing system to be comprising:
       a component configured to normalize a first contour in the glyph and a second contour in the glyph to generate a first normalized contour and a second normalized contour, and to compare the first normalized contour to the second normalized contour, by at least one of comparing a first number of points of the first normalized contour to a second number of points of the second normalized contour, comparing a first position of points of the first normalized contour to a second position of points of the second normalized contour, or comparing a first order of points of the first normalized contour to a second order of points of the second normalized contour;
       a component configured to determine, based on the comparing, that the first normalized contour and the second normalized contour comprise at least one of a same number of points, a same position of points or a same order of points indicating that the first contour and the second contour correspond to a common contour; and a contour replacement component configured to, based upon the determining, replace the first contour with a first reference to a common simple glyph for the common contour and replace the second contour with a second reference to the common simple glyph to consolidate the glyph, one or more of the first contour or the second contour comprising a closed line.

14. The system of claim 13, the common contour comprising a same glyph contour identified in a plurality of locations in the glyph.

15. The system of claim 13, executing the instructions implementing a consolidation determination component configured to determine whether a desired consolidation threshold is met.

16. The system of claim 15, the contour replacement component configured to consolidate the glyph merely if the desired consolidation threshold is met.

17. The system of claim 13, executing the instructions implementing a simple glyph creation component configured to create the common simple glyph.

18. The system of claim 13, executing the instructions implementing a replacement glyph creation component configured to perform one or more of:
   create a non-common contour glyph comprising non-common contours of the glyph; or
   create a replacement complex glyph comprising a reference to the non-common contour glyph.

19. The system of claim 13, comprising a normalization component configured to normalize a first glyph contour and a second glyph contour so that the first glyph contour can be compared with the second glyph contour.

20. A computer readable device comprising instructions that when executed perform a method for consolidating a glyph of a font, comprising:
   normalizing a first contour in the glyph and a second contour in the glyph to generate a first normalized contour and a second normalized contour;
   comparing the first normalized contour to the second normalized contour, comprising at least one of comparing a first number of points of the first normalized contour to a second number of points of the second normalized contour, comparing a first position of points of the first normalized contour to a second position of points of the second normalized contour or comparing a first order of points of the first normalized contour to a second order of points of the second normalized contour;
   based upon the comparing, determining that the first normalized contour and the second normalized contour comprise at least one of a same number of points, a same position of points or a same order of points indicating that the first contour and the second contour correspond to a common contour; and
   based upon the determining, replacing the first contour with a first reference to a common simple glyph for the common contour and replacing the second contour with a second reference to the common simple glyph to consolidate the glyph.

* * * * *